Nov. 7, 1933.    W. S. FISHER    1,934,051
LUBRICATING SYSTEM FOR SLEEVE VALVE ENGINES
Original Filed April 30, 1923    3 Sheets-Sheet 1
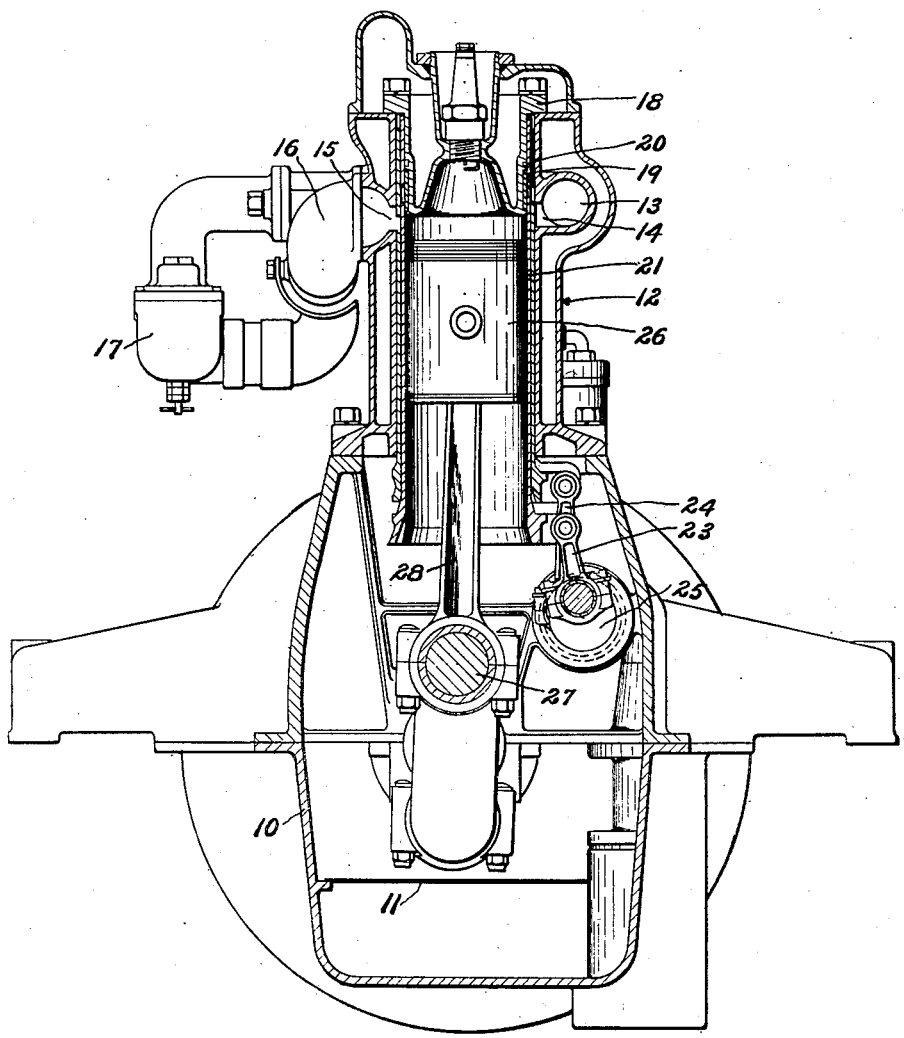
Fig. I.
INVENTOR.
Walter S. Fisher
BY Solon J. Boughton
ATTORNEY.

Nov. 7, 1933.                W. S. FISHER                1,934,051
              LUBRICATING SYSTEM FOR SLEEVE VALVE ENGINES
                Original Filed April 30, 1923    3 Sheets-Sheet 2
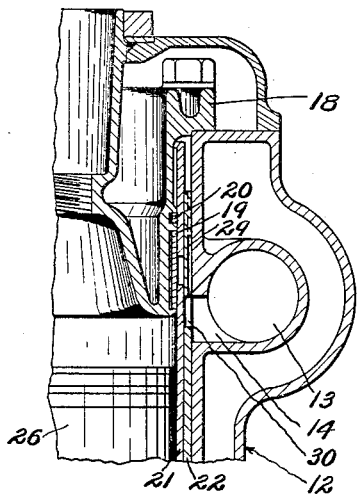
Fig. I.
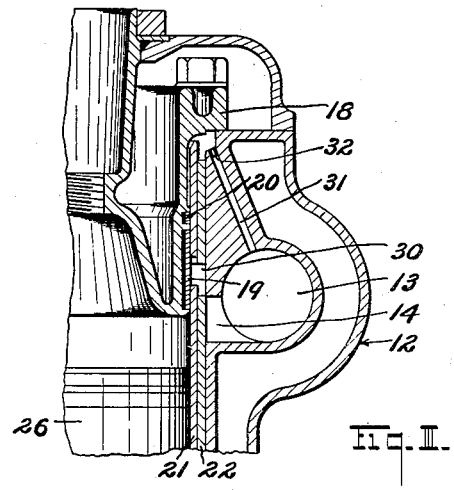
Fig. II.
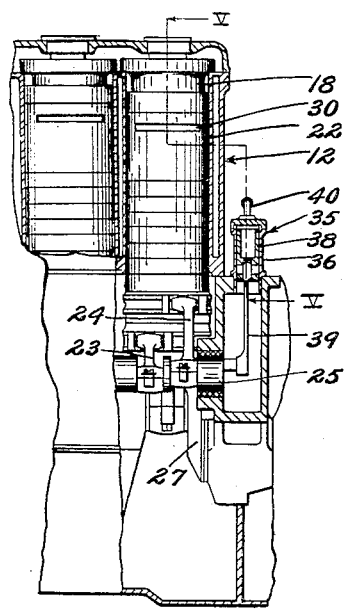
Fig. IV.
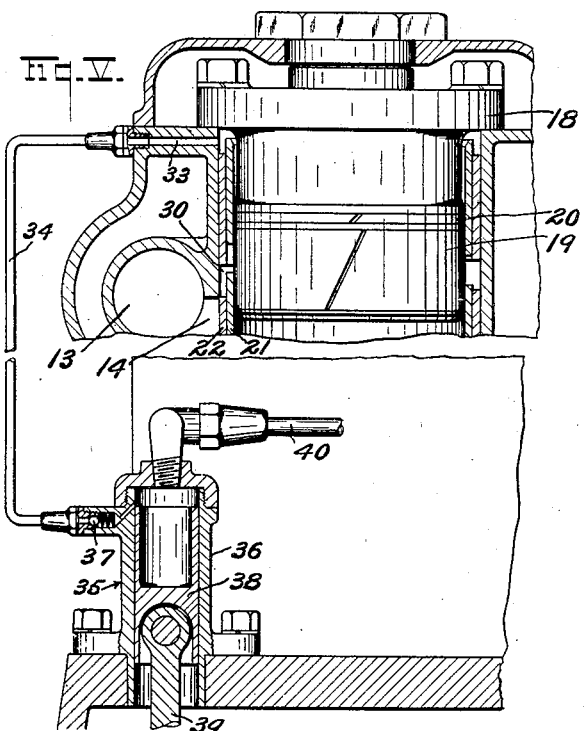
Fig. V.
INVENTOR.
Walter S. Fisher
BY Solon J. Boughton
ATTORNEY

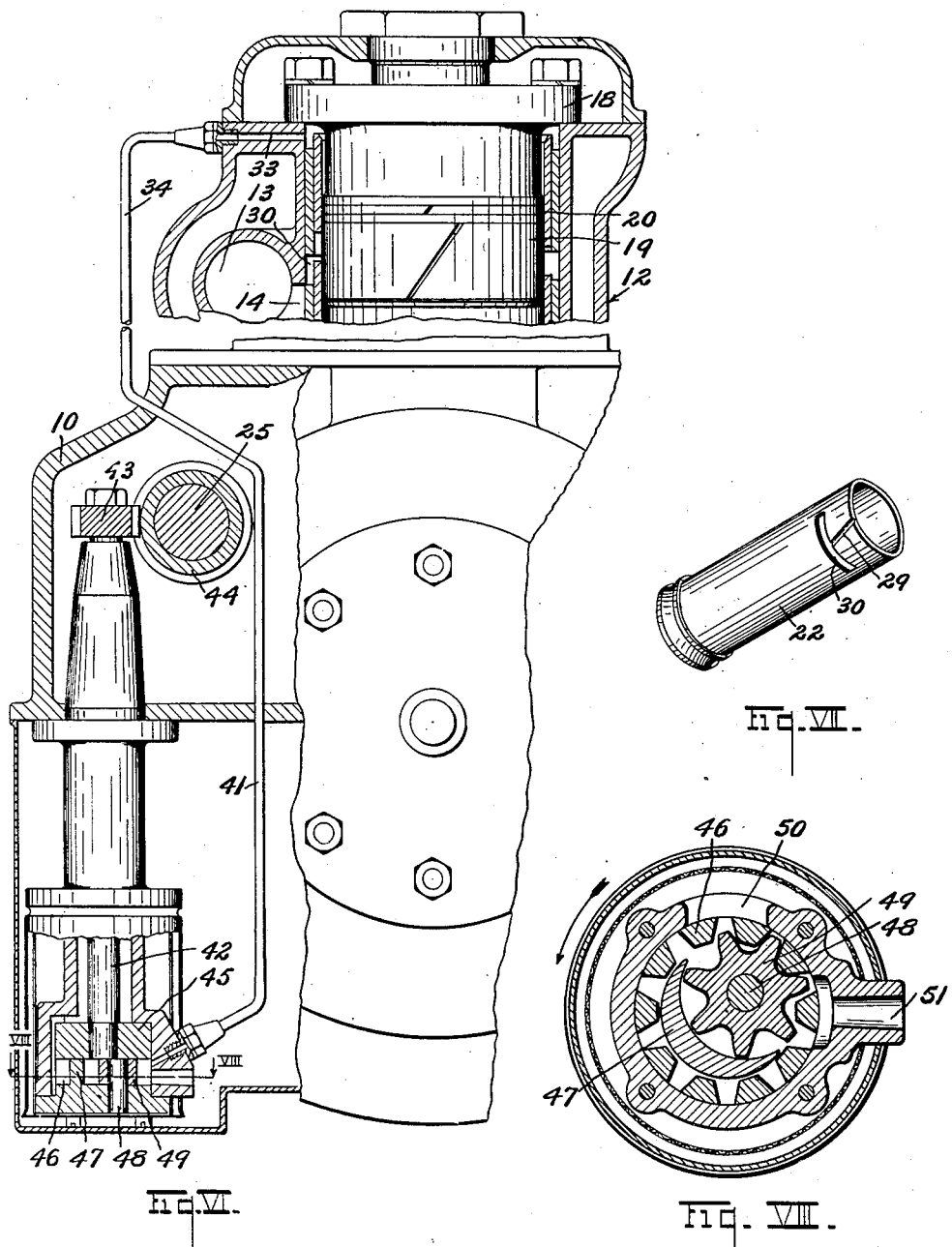

Patented Nov. 7, 1933

1,934,051

UNITED STATES PATENT OFFICE 1,934,051

LUBRICATING SYSTEM FOR SLEEVE VALVE ENGINES

Walter S. Fisher, Toledo, Ohio, assignor to The Willys Overland Company, Toledo, Ohio, a corporation of Ohio Application April 30, 1923, Serial No. 635,701
Renewed May 7, 1927

23 Claims. (Cl. 123—196)

This invention relates to improvements in lubricating systems for sleeve valve engines.

In engines of this type, considerable difficulty has been experienced heretofore in providing adequate lubrication for the upper ends of the sleeves, without complication and undue expense. That this is naturally the case will be apparent when it is recalled that the valve sleeves are comparatively long and that the oil for their lubrication is most economically delivered to those portions of the sleeves which protrude into the crank case. Furthermore, the air which is trapped in the space above the ends of the sleeves must necessarily be compressed a part of the time, that is, when both of the sleeves are moving upwardly as occurs during a portion of the engine cycle. At such times, any oil that has worked its way into this space is likely to be forced out of it by the air pressure.

One of the objects of my invention is the provision of a relief for the space between the cylinder and cylinder head above the sleeves, so that there can be no pressure exerted there at any time tending to evict the oil which has collected in such space.

Another object is to create, in the space mentioned, an actual vacuum of sufficient degree to assist the flow of oil upwardly between the sleeves and between the cylinder and outer sleeve into the said space.

A further object of the invention is to utilize for the creation of the desired vacuum above the sleeves, the suction present in the intake manifold of a multiple cylinder engine substantially at all times.

Other objects, and objects relating to details of construction and economies of manufacture, will appear as I proceed with the description of those embodiments of the invention, which, for the purposes of the present application, I have illustrated in the accompanying drawings, in which:

Figure I is a view partially in vertical transverse section, of an engine embodying my invention.

Fig. II is a detail, vertical, sectional view showing the intake manifold and associated parts of Fig. I on a larger scale.

Fig. III is a view similar to Fig. II, but showing a modification.

Fig. IV is a view partly in longitudinal section, showing a portion of an engine equipped with a vacuum pump.

Fig. V is a sectional view taken substantially on the line V—V, Fig. IV, and showing on a large scale, a modification in which the vacuum pump is used to create the necessary vacuum above the sleeves.

Fig. VI is a sectional view showing still another modification, in which the vacuum is created by means of a combined oil and vacuum pump.

Fig. VII is a perspective view of an outer sleeve in which is formed an oil groove used in the modification illustrated in Figs. I and II, and Fig. VIII is a horizontal section taken substantially on the line VIII—VIII, Fig. VI.

Similar reference characters refer to like parts throughout the views.

In the drawings, 10 represents the crank case of an internal combustion engine, in which there is an oil splash pan 11. 12 is the cylinder block including an intake manifold 13 with intake ports 14. Opposite the latter are exhaust ports 15 opening into an exhaust manifold 16. The carburetor 17 takes heated air from about the exhaust manifold, and discharges its mixture into a passage extending through the cylinder block to the middle portion of the intake manifold 13.

Each cylinder head 18 is bolted to the top of the cylinder casting, and depends into its respective cylinder, concentric with, but spaced from the walls thereof. Mounted in the outer surface of the cylinder head are a wide head ring 19, and a narrow ring 20. Inner and outer valve sleeves 21 and 22 of conventional design reciprocate within the cylinder and have a snug sliding fit between the cylinder and cylinder head. They are driven by short connecting rods 23 and 24 from an eccentric shaft 25. A piston 26 slides within the inner sleeve, being joined to the crank shaft 27 by a connecting rod 28.

The above is a description of the principal parts in a well-known form of sliding sleeve valve engine commonly designated as the "Knight" engine. Lubrication of the sleeves and of the piston is effected by splash, that is, oil is thrown by the lower ends of the connecting rods onto the surfaces of the sleeves, and works its way upward because of the reciprocation of the sleeves and of the piston within the inner sleeve. In addition, and as illustrated in Fig. IV, the sleeves are provided with a plurality of annular parallel oil grooves, which, as is to be noted, are not necessarily limited to the area of the sleeve below the port openings. As explained heretofore, however, it has been found difficult to adequately lubricate the upper ends of the sleeves and to maintain any oil in the space above the sleeves in what may be termed the sleeve chamber.

In the preferred form of my invention, illustrated in Figs. I, II and VII, I cut a groove 29 in the outer surface of the outer sleeve 22 connecting the intake port 30 thereof with the space above the sleeve. Within the intake manifold 13 there is substantially continuous suction due to the closely successive suction impulses received from the various cylinders. Consequently, when the ports 14 and 30 are in registration, substantially continuous suction is exerted through the passage provided by the groove 29, thus tending to create a partial vacuum in the space above the sleeves between the cylinder and cylinder head. When ports 14 and 30 are not in registration, the space above the sleeves has reached an approximate minimum, as the inner sleeve is descending at a rate approximately the same as the rate of the ascending outer sleeve. For this reason, the volume of the space above the sleeves is either equal to or greater than the volume of the space when the ports 14 and 30 are in registration. The increase of volume produces a partial vacuum during the portion of the cycle in which ports 14 and 30 are not in registration, and results in a substantially continuous partial vacuum in the space above the sleeves. This vacuum tends to draw oil up into the space above the sleeves, and also counteracts the tendency for the oil to be forced out of the space when the two sleeves move upwardly at the same time. The result is much better lubrication at the upper ends of the sleeves.

In Fig. III, I have illustrated a modification in which the provision of a partial vacuum is dependent upon the intake suction, as in the first modification, but in which I utilize a passage 31 formed in the cylinder block connecting the intake manifold 13 directly with the space above the sleeves, so that suction is exerted on this space at all times. For convenience in manufacture, I make the passage 31 larger than is desirable and lessen its effective size by inserting a plug 32 in the top of the passage with a hole therethrough of the proper cross sectional dimensions.

In a further modification illustrated in Figs. IV and V, I connect the space above the sleeves by means of a bore 33 in the cylinder and a tube 34 with the intake side of a vacuum pump 35. This pump includes a cylinder 36 opening at the bottom into the crank case and provided with the usual check valves, one only of which is shown at 37. A piston 38 slides within the cylinder 36, being driven by a connecting rod 39 from the eccentric shaft 25. The exhaust pipe 40 may be open to the atmosphere, or may deliver its contents into the crank case, if desired. The oil vapor present in the crank case provides the necessary lubrication between the pump cylinder 36 and its piston 38.

In the modification of Figs. VI and VIII, the principle is the same as in the modification last described, but the air is exhausted through a tube 41 which connects with the intake side of a gear pump commonly employed for pumping oil. A vertical shaft 42 is driven by means of spiral gears 43 and 44 from the eccentric shaft 25. To the lower end of this shaft 42 is attached a gear 45 having internal teeth 46 integral with and depending from an upper disc-like portion. The bottom wall of the pump casing has an integral crescent 47 formed upon its upper side. A stub shaft 48 also extends upwardly from the base of the casing and carries an idler gear 49 meshing with the teeth 46. The casing is provided with an intake opening 50 for taking oil from the sump, and a discharge duct 51 leading to the various bearings of the engine and other parts requiring lubrication. The pipe 41 is also tapped into the pump casing at a point just above the oil intake 50. The direction of rotation of the shaft 42 and the teeth 46 is indicated by the arrow in Fig. VIII. The operation of the pump as to both oil and air, will be obvious without further description. Air and oil are constantly drawn into the pump at 50 and are discharged together at 51. A partial vacuum is thus produced above the sleeves as in the previously described modifications.

In all of the forms of my invention herein described, oil must be delivered onto the sleeves either by splash or some other means. As the sleeves move longitudinally with respect to each other and the cylinder wall and the piston, the various films of oil spread over the surfaces of the sleeves, piston and cylinder and gradually move upwardly. This latter motion is assisted by the partial vacuum which is created by my invention above the upper ends of the sleeves, such vacuum tending to maintain a quantity of oil in this space at all times to be distributed as required.

While I have shown and described in detail, certain particular structural embodiments as illustrative of my invention, I do not wish to be limited thereby, since various changes may be made without departing from the spirit and scope of the invention as covered by the appended claims.

I claim as my invention:

1. In an internal combustion engine, a cylinder, a cylinder head depending thereinto in spaced relation therewith, and a reciprocating valve having its upper end extending into the space between the cylinder and cylinder head and having an intake port and a groove extending upwardly therefrom and adapted to communicate with said space.

2. In an internal combustion engine, a cylinder, a cylinder head depending thereinto in spaced relation therewith and a reciprocating valve having its upper end extending into the space between the cylinder and cylinder head and having an intake port and a groove extending upwardly therefrom and adapted to communicate with said space, and means for depositing oil upon the valve below said intake port.

3. In an internal combustion engine, a cylinder, a cylinder head depending thereinto and spaced therefrom, a pair of concentric reciprocating valve sleeves having their upper ends extending into the space between the cylinder and cylinder head, and means for depositing oil upon the lower portion of the sleeves, said cylinder having an intake port and the outer sleeve of said concentric pair having a groove in its outer surface adapted to connect the intake port with the space above the sleeves.

4. In an internal combustion engine, a cylinder, a piston, a valve sleeve interposed therebetween, a depending cylinder head surrounded by said sleeve, said cylinder having an intake port below said cylinder head, means for depositing oil upon a lower portion of the sleeve, and means for producing a substantially continuous partial vacuum in the space above said sleeve, said space being substantially closed to atmosphere during the operation of the engine.

5. In an internal combustion engine, a cylinder, a cylinder head depending thereinto and spaced therefrom, said cylinder having an intake port below said cylinder head, a sleeve with its upper end located in the space between the cylinder and cylinder head, means for depositing oil upon a lower portion of the sleeve, and means for producing a substantially continuous partial vacuum in the space above the sleeve, said space being substantially closed to atmosphere during the operation of the engine.

6. In an internal combustion engine, a cylinder, a cylinder head depending thereinto and spaced therefrom, said cylinder having an intake port below said cylinder head, a pair of concentric reciprocating sleeves with their upper ends located in the space between the cylinder and cylinder head, means for depositing oil upon the lower portions of the sleeves, and means for producing a partial vacuum in the space above the sleeves, said sleeves being adapted to permit the upward flow of oil therebetween to said space, and the said space being otherwise closed to atmosphere during the operation of the engine.

7. In an internal combustion engine, a plurality of cylinders, a cylinder head for each cylinder depending thereinto and spaced therefrom, each cylinder having an intake port below said cylinder head, a sleeve with its upper end located in the space between the cylinder and cylinder head, means for depositing oil upon a lower portion of the sleeve, an intake manifold, and means for connecting said intake manifold with said space above said sleeve through a small passage located wholly within the engine.

8. In an internal combustion engine, an inlet manifold, a cylinder, a cylinder head depending thereinto and spaced therefrom, a reciprocating valve sleeve having its upper end extending into the space between the cylinder and cylinder head, means for depositing oil upon a lower portion of the sleeve, said cylinder having an intake port opening into said manifold and said sleeve having a groove in its outer surface connecting the intake port with the space above the sleeve.

9. In an internal combustion engine, a cylinder having an intake port, a cylinder head therein in spaced relation thereto, a reciprocating sleeve valve having its upper end extending into the space between the cylinder and cylinder head and having an intake port for admitting fuel to the cylinder, an intake manifold, and means for establishing communication between the intake manifold and the space between the cylinder and cylinder head, said means including the sleeve intake port when the latter is in communication with the cylinder intake port.

10. A sleeve for Knight engines having intake and exhaust ports and provided with a channel way extending from the intake port to the upper end of the sleeve.

11. In an internal combustion engine of the sleeve valve type, a cylinder, a cylinder head mounted therein, a piston to reciprocate within the cylinder, a valve mechanism cooperative with the piston including a sleeve member interposed between the piston and cylinder adapted to form a sleeve chamber with the cylinder head, means to supply a lubricant to the lower portion of the sleeve and means for lubricating the upper extremity of the sleeve with oil supplied to the lower portion thereof, including means for maintaining a substantially reduced operative fluid pressure within the sleeve chamber.

12. In an internal combustion engine of the sleeve valve type, a cylinder, a cylinder head mounted therein, a piston within the cylinder chamber, a valve mechanism co-operative with the piston including two co-operative reciprocative sleeve members each having intake and exhaust ports adapted to register periodically with each other, means to supply lubricant to the lower portion of the sleeves, said cylinder, cylinder head and reciprocative sleeves being disposed to form a sleeve chamber apart from the cylinder chamber, and means for lubricating the upper extremities of the sleeves with the oil deposited on the lower portion thereof, including means communicative with the sleeve chamber and cooperative with the reciprocating piston adapted to maintain a reduced normally operative fluid pressure within the sleeve chamber.

13. In a Knight engine a cylinder having intake and exhaust ports, a cylinder head, a reciprocative piston, inner and outer sleeves each provided with intake and exhaust ports adapted to register periodically with each other and with the ports of the cylinder, means for supplying lubricant to the sleeves, said sleeves, cylinder and cylinder head being disposed to form a closed sleeve chamber, one of said sleeves being provided with a passageway extending from the intake port to the chamber adapted to create a reduced fluid pressure within the chamber.

14. A sleeve valve engine including a cylinder having an intake manifold, a piston, a pair of reciprocative sleeves provided with intake and exhaust ports, and means for supplying a lubricant to the surface of the sleeves below the ports thereof, a sleeve chamber adjacent the upper extremity of the sleeves normally closed to the atmosphere, and means for facilitating the lubrication of the upper portion of the sleeve including means interconnecting the sleeve chamber with the intake manifold whereby a reduced fluid pressure is maintained within the chamber.

15. A sleeve valve engine including a cylinder having an intake manifold, a piston, a pair of reciprocative sleeves provided with intake and exhaust ports, and means for supplying a lubricant to the surface of the sleeves below the ports thereof, a sleeve chamber adjacent the upper extremity of the sleeves normally closed to the atmosphere, means for facilitating lubrication of the portion of the sleeve above the ports including means interconnecting the sleeve chamber with the intake manifold adapted to maintain at all times a reduced normally operative fluid pressure within the sleeve chamber.

16. A method of lubricating the sleeve surfaces of a Knight engine that comprises supplying lubricant to the lower portion of the sleeves and facilitating upward movement of the oil from the lower portion of the sleeves by reducing the fluid pressure acting against the upper portions of the sleeves.

17. A method of lubricating the surfaces of sleeves of Knight engines that comprises supplying to the portion of the sleeves below the ports lubricant in excess of the quantity required to lubricate said portion, and subjecting the upper portion of the sleeves to the evacuating action of the pistons of the engine thereby facilitating the upward trend of the oil from the lower portion of the sleeves.

18. A method of lubricating the upper portion of the sleeves of a Knight engine by means of oil normally accumulated on the lower portion of said sleeves that comprises subjecting the upper portion of the sleeves to a reduced normal operative fluid pressure.

19. A method of lubricating the surfaces of sleeves of a Knight engine having an annular chamber above the valve sleeves normally closed to the atmosphere, that comprises supplying to the lower portion of the sleeves lubricant in excess of the quantity required to lubricate said portion and facilitating the upward movement of the excess of oil upon the lower portion of the sleeve by maintaining the chamber at a reduced normally operative fluid pressure.

20. A method of lubricating the portion of the sleeves of a Knight engine above the ports by means of oil accumulated on the lower surface of the sleeves that comprises reducing the normal operative fluid pressure within the sleeve chamber whereby an upward flow of oil is facilitated.

21. In an internal combustion engine, the combination of a cylinder having fuel inlet and exhaust ports, a reciprocatory piston therein, reciprocatory sleeve means controlling said cylinder ports, and having a transverse, fluid-collecting channel, means to lubricate said cylinder, piston and sleeve means, and means to remove the contents of said sleeve means channel.

22. In a sleeve valve engine, including a cylinder, a piston and a pair of reciprocatory valve sleeves said sleeves being provided with oil grooves on the surface thereof, means for supplying oil to the sleeves, means for subjecting portions of the surface of said sleeves to an external source of normally reduced pneumatic pressure whereby oil is withdrawn therefrom, and means for returning the oil to the oil supplying means.

23. A sleeve valve engine of the Knight class including a cylinder, piston and reciprocatory telescoping sleeves said sleeves being provided with transverse oil grooves, means for supplying oil to the sleeves, and external suction means for removing excess oil from the surface of the sleeves.

WALTER S. FISHER.